(12) United States Patent
Yoshida

(10) Patent No.: US 11,488,477 B2
(45) Date of Patent: Nov. 1, 2022

(54) DRIVING ASSISTANCE DEVICE, MAP TRANSMISSION DEVICE, DRIVING ASSISTANCE PROGRAM, MAP TRANSMISSION PROGRAM, AND DRIVING ASSISTANCE SYSTEM

(71) Applicant: Mitsubishi Electric Corporation, Tokyo (JP)

(72) Inventor: Michinori Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 16/486,729

(22) PCT Filed: Feb. 22, 2017

(86) PCT No.: PCT/JP2017/006533
§ 371 (c)(1),
(2) Date: Aug. 16, 2019

(87) PCT Pub. No.: WO2018/154645
PCT Pub. Date: Aug. 30, 2018

(65) Prior Publication Data
US 2019/0385456 A1 Dec. 19, 2019

(51) Int. Cl.
*G08G 1/16* (2006.01)
*G05D 1/02* (2020.01)

(52) U.S. Cl.
CPC .............. *G08G 1/16* (2013.01); *G05D 1/0274* (2013.01); *G05D 1/0276* (2013.01)

(58) Field of Classification Search
CPC ............... G08G 1/16; G08G 1/096783; G08G 1/096791; G08G 1/096741; G08G 1/162;
(Continued)

(56) References Cited

U.S. PATENT DOCUMENTS

2006/0224301 A1 10/2006 Sakagami et al.
2010/0099353 A1 4/2010 Komori
(Continued)

FOREIGN PATENT DOCUMENTS

CN 101632109 A 1/2010
DE 102013220426 B3 * 3/2015 .............. B60L 58/12
(Continued)

OTHER PUBLICATIONS

International Search Report for PCT/JP2017/006533 dated May 30, 2017 [PCT/ISA/210].
(Continued)

*Primary Examiner* — Rodney A Butler
(74) *Attorney, Agent, or Firm* — Sughrue Mion, PLLC; Richard C. Turner

(57) ABSTRACT

A driving assistance system (1) is provided with a driving assistance device (10) mounted in a mobile body (31), and a map transmission device (20) mounted in a peripheral body such as a road side apparatus (33) or a mobile body (32) which is present on the periphery of the mobile body. The driving assistance device (10) transmits request data according to a moving speed of the mobile body to the peripheral body. The map transmission device (20) transmits an obstacle map indicating an obstacle within a range according to the request data transmitted by the driving assistance device (10), to the mobile body (31) as an external map. The driving assistance device (10) receives the external map transmitted by the map transmission device (20).

11 Claims, 17 Drawing Sheets

(58) Field of Classification Search
CPC .... G08G 1/166; G05D 1/0274; G05D 1/0276; H04M 11/00; B60W 30/18; B60W 40/06; G01C 21/26
See application file for complete search history.

(56) References Cited

U.S. PATENT DOCUMENTS

| | | | | |
|---|---|---|---|---|
| 2010/0198513 | A1* | 8/2010 | Zeng | G01S 17/931 |
| | | | | 701/300 |
| 2012/0161951 | A1 | 6/2012 | Ito et al. | |
| 2017/0113665 | A1* | 4/2017 | Mudalige | G08G 1/166 |
| 2018/0362011 | A1* | 12/2018 | Picron | G01S 17/931 |

FOREIGN PATENT DOCUMENTS

| | | | | |
|---|---|---|---|---|
| JP | 2003-063280 | A | 3/2003 | |
| JP | 2005-202913 | A | 7/2005 | |
| JP | 2006-072617 | A | 3/2006 | |
| JP | 2006-227690 | A | 8/2006 | |
| JP | 2006-285694 | A | 10/2006 | |
| JP | 2008-225786 | A | 9/2008 | |
| JP | 2009-193314 | A | 8/2009 | |
| JP | 2010-003242 | A | 1/2010 | |
| JP | 4400584 | B2 * | 1/2010 | ............ B60W 40/02 |
| JP | 2010-267212 | A | 11/2010 | |
| JP | 2011-253241 | A | 12/2011 | |
| JP | 2012-093883 | A | 5/2012 | |
| JP | 2012-133686 | A | 7/2012 | |
| JP | 2016-181121 | A | 10/2016 | |

OTHER PUBLICATIONS

Office Action for JP 2017-546928 dated Oct. 25, 2017.
Communication dated May 6, 2021 from The State Intellectual Property Office of P.R. of China in Application No. 201780086702.8.

* cited by examiner

DRIVING ASSISTANCE DEVICE, MAP TRANSMISSION DEVICE, DRIVING ASSISTANCE PROGRAM, MAP TRANSMISSION PROGRAM, AND DRIVING ASSISTANCE SYSTEM

CROSS REFERENCE TO RELATED APPLICATIONS

This application is a National Stage of International Application No. PCT/JP2017/006533 filed Feb. 22, 2017.

TECHNICAL FIELD

The present invention relates to a communication technology for an obstacle map which indicates an obstacle.

BACKGROUND ART

Studies have been made on an attempt by a driving assistance device mounted in a mobile body such as a vehicle to receive an obstacle map indicating an obstacle detected by another vehicle or the like from another vehicle or the like traveling near the mobile body, and to assist driving of the mobile body by utilizing the received obstacle map.

When information of obstacles indicated by the obstacle map received by the driving assistance device increases, a communication traffic increases, leading to an increase in time required for acquiring the obstacle map. Consequently, it becomes difficult for the driving assistance device to acquire the obstacle map on a real-time basis. When performing driving assistance, new information is useful. Therefore, it is crucial to avoid a situation where an obstacle map cannot be acquired on a real-time basis.

Patent Literature 1 describes that coordinates of an intersection are held as an address, and when a vehicle enters a range of that address, information of an obstacle being present in the intersection is transmitted to the vehicle. In Patent Literature 1, the range where the information of the obstacle is acquired is restricted to within the intersection which the vehicle has entered, thereby decreasing the information of the obstacle.

CITATION LIST

Patent Literature

Patent Literature 1: JP 2005-202913

SUMMARY OF INVENTION

Technical Problem

According to the method described in Patent Literature 1, an intersection is managed as a static address, and information of inside of the range of the defined intersection is transmitted to a vehicle. Thus, to transmit only necessary information by dynamically changing the range cannot be achieved. As a result, depending on the situation of the vehicle, information of an unnecessary obstacle is also transmitted to the vehicle. Inversely, depending on the situation of the vehicle, information of a necessary obstacle is not transmitted to the vehicle.

The present invention has as its object to enable acquiring information of an obstacle in an appropriate range.

Solution to Problem

A driving assistance device according to the present invention includes:

a request transmission unit to transmit request data according to a moving speed of a mobile body to a peripheral body being present on a periphery of the mobile body; and a map reception unit to receive an obstacle map indicating an obstacle within a range according to the request data transmitted by the request transmission unit, from the peripheral body as an external map.

Advantageous Effects of Invention

According to the present invention, request data according to a moving speed of a mobile body is transmitted, and an obstacle map indicating an obstacle within a range according to the request data is received. As a result, it is possible to acquire information of an obstacle within an appropriate range according to the moving speed of the mobile body.

DESCRIPTION OF EMBODIMENTS

Embodiment 1.

*Description of Configuration*

Figure 1:
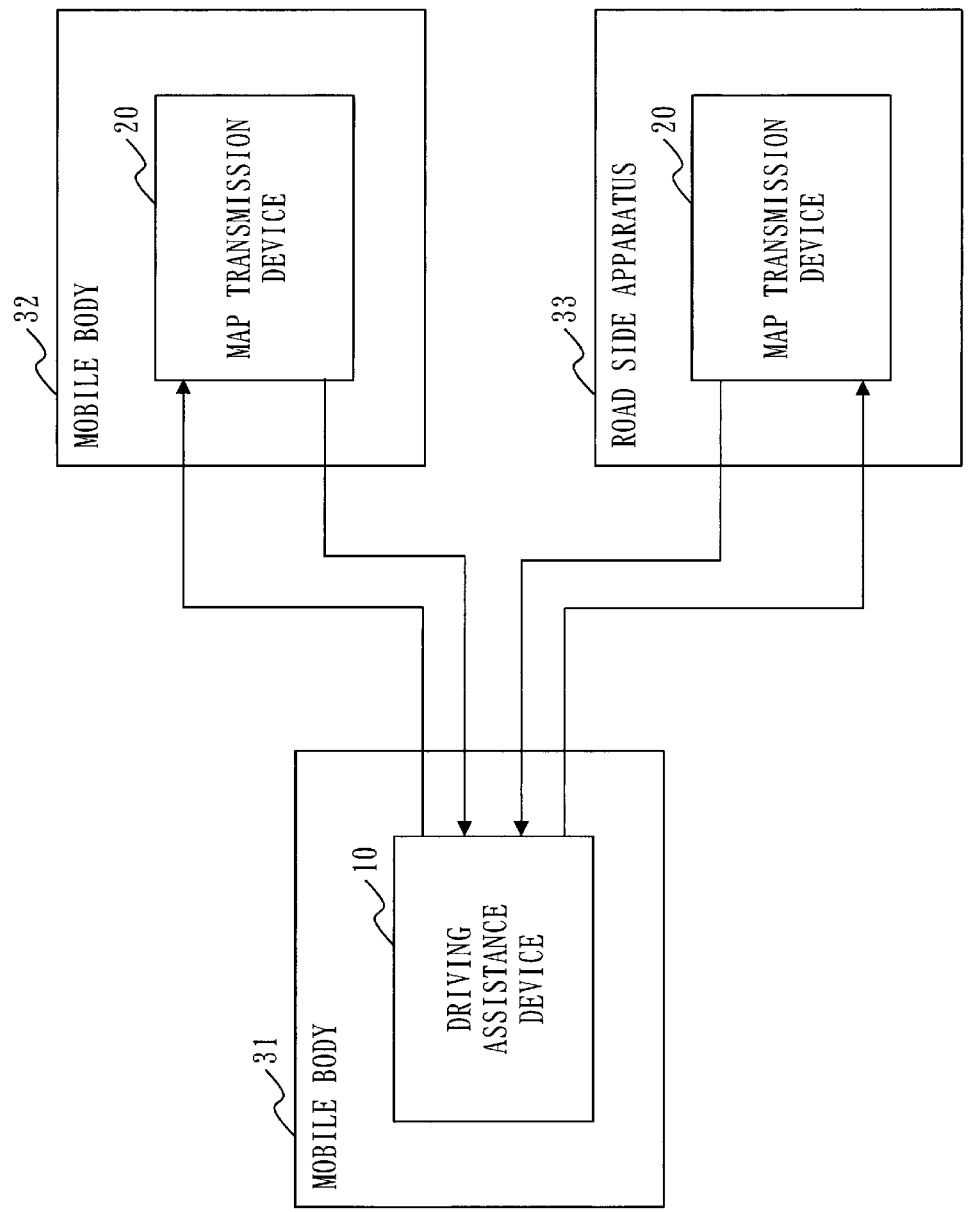
FIG. 1 is a configuration diagram of a driving assistance system 1 according to Embodiment 1.

A configuration of a driving assistance system 1 according to Embodiment 1 will be described with referring to FIG. 1.

The driving assistance system 1 is provided with a driving assistance device 10 and map transmission devices 20.

The driving assistance device 10 is a computer mounted in a mobile body 31 such as a vehicle. Each map transmission device 20 is a computer mounted in a mobile body 32 such as a vehicle, or a computer mounted in a road side apparatus 33. In Embodiment 1, the map transmission device 20 will be described as a computer mounted in the mobile body 32.

The driving assistance device 10 and the map transmission devices 20 are communicable with each other via a wireless network.

A configuration of the driving assistance device 10 according to Embodiment 1 will be described with referring to FIG. 2.

The driving assistance device 10 is provided with hardware devices of a processor 11, memory 12, storage 13, communication interface 14, and sensor interface 15. The processor 11 is connected to the other hardware devices via signal wires and controls the other hardware devices.

The driving assistance device 10 is provided with a request transmission unit 111, a map reception unit 112, a data acquisition unit 113, a map generation unit 114, and map synthesis unit 115, as functional constituent elements. The functions of the request transmission unit 111, map reception unit 112, data acquisition unit 113, map generation unit 114, and map synthesis unit 115 are implemented by software.

The storage 13 stores a program that implements the functions of the request transmission unit 111, map reception unit 112, data acquisition unit 113, map generation unit 114, and map synthesis unit 115. This program is read into the memory 12 by the processor 11 and executed by the processor 11. Thus, the functions of the request transmission unit 111, map reception unit 112, data acquisition unit 113, map generation unit 114, and map synthesis unit 115 are implemented.

The storage 13 implements the functions of a map storing unit 131, sensing range storing unit 132, and coefficient storing unit 133.

The map storing unit 131 stores map data. The map data may be updated by update data acquired via the communication interface 14. In Embodiment 1, the map data is expressed by an absolute coordinate system. The absolute coordinate system may be expressed using latitudes and longitudes, or by relative positions with reference to a certain location as an origin. In the map data, a drive way, a pedestrian way, and a feature are expressed by dots and lines.

The sensing range storing unit 132 stores the sensing range of a sensor mounted in the mobile body 31.

The coefficient storing unit 133 stores coefficients for different weathers.

A configuration of the map transmission device 20 according to Embodiment 1 will be described with referring to FIG. 3.

The map transmission device 20 is provided with hardware devices of a processor 21, memory 22, storage 23, communication interface 24, and sensor interface 25. The processor 21 is connected to the other hardware devices via signal wires and controls the other hardware devices.

The map transmission device 20 is provided with a request reception unit 211, a map transmission unit 212, a data acquisition unit 213, and a map generation unit 214 as functional constituent elements. The functions of the request reception unit 211, map transmission unit 212, data acquisition unit 213, and map generation unit 214 are implemented by software.

The storage 23 stores a program that implements the functions of the request reception unit 211, map transmission unit 212, data acquisition unit 213, and map generation unit 214. This program is read into the memory 22 by the processor 21 and executed by the processor 21. Thus, the functions of the request reception unit 211, map transmission unit 212, data acquisition unit 213, and map generation unit 214 are implemented.

The processors 11 and 21 are each an IC (Integrated Circuit) which performs processing. Specific examples of the processors 11 and 21 are a CPU (Central Processing Unit), a DSP (Digital Signal Processor), and a GPU (Graphics Processing Unit).

The memories 12 and 22 are each a storage device which stores data temporarily. Specific examples of the memories 12 and 22 are an SRAM (Static Random Access Memory) and a DRAM (Dynamic Random Access Memory).

The storages 13 and 23 are each a storage device which stores data. A specific example of the storages 13 and 23 is an HDD (Hard Disk Drive). The storages 13 and 23 may be each a portable storage medium such as an SD (registered trademark; Secure Digital) memory card, a CF (Compact Flash), a NAND flash, a flexible disk, an optical disk, a compact disk, a blu-ray (registered trademark) disk, and a DVD (Digital Versatile Disk).

The communication interfaces 14 and 24 are each an interface for communicating with an external device. Practical examples of the communication interfaces 14 and 24 are an Ethernet (registered trademark) port, a USB (Universal Serial Bus) port, and an HDMI (registered trademark; High-Definition Multimedia Interface) port.

The sensor interfaces 15 and 25 are interfaces for communicating with sensors such as LIDARs (Light Detection and Ranging), millimeter-wave radars, sonars, cameras, rain sensors, and positioning signal receivers which are mounted in the mobile bodies 32 and 31. Specific examples of the sensor interfaces 15 and 25 are an USB port and an HDMI (registered trademark) port.

Figure 2:
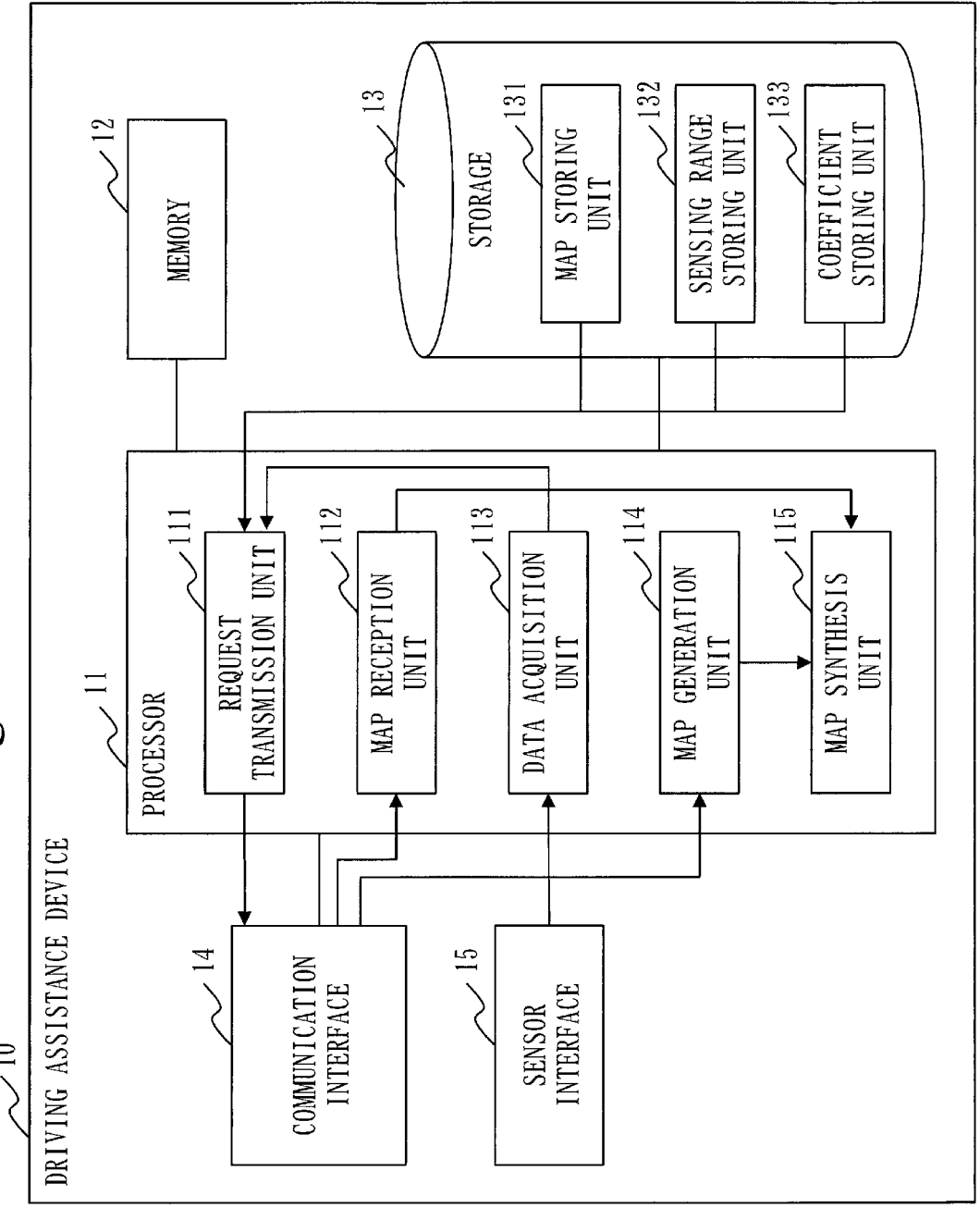
FIG. 2 is a configuration diagram of a driving assistance device 10 according to Embodiment 1.

FIG. 2 illustrates only one processor 11. However, the driving assistance device 10 may be provided with a plurality of processors that replace the processor 11. The plurality of processors share execution of the program that implements the functions of the request transmission unit 111, map reception unit 112, data acquisition unit 113, map generation unit 114, and map synthesis unit 115.

Figure 3:
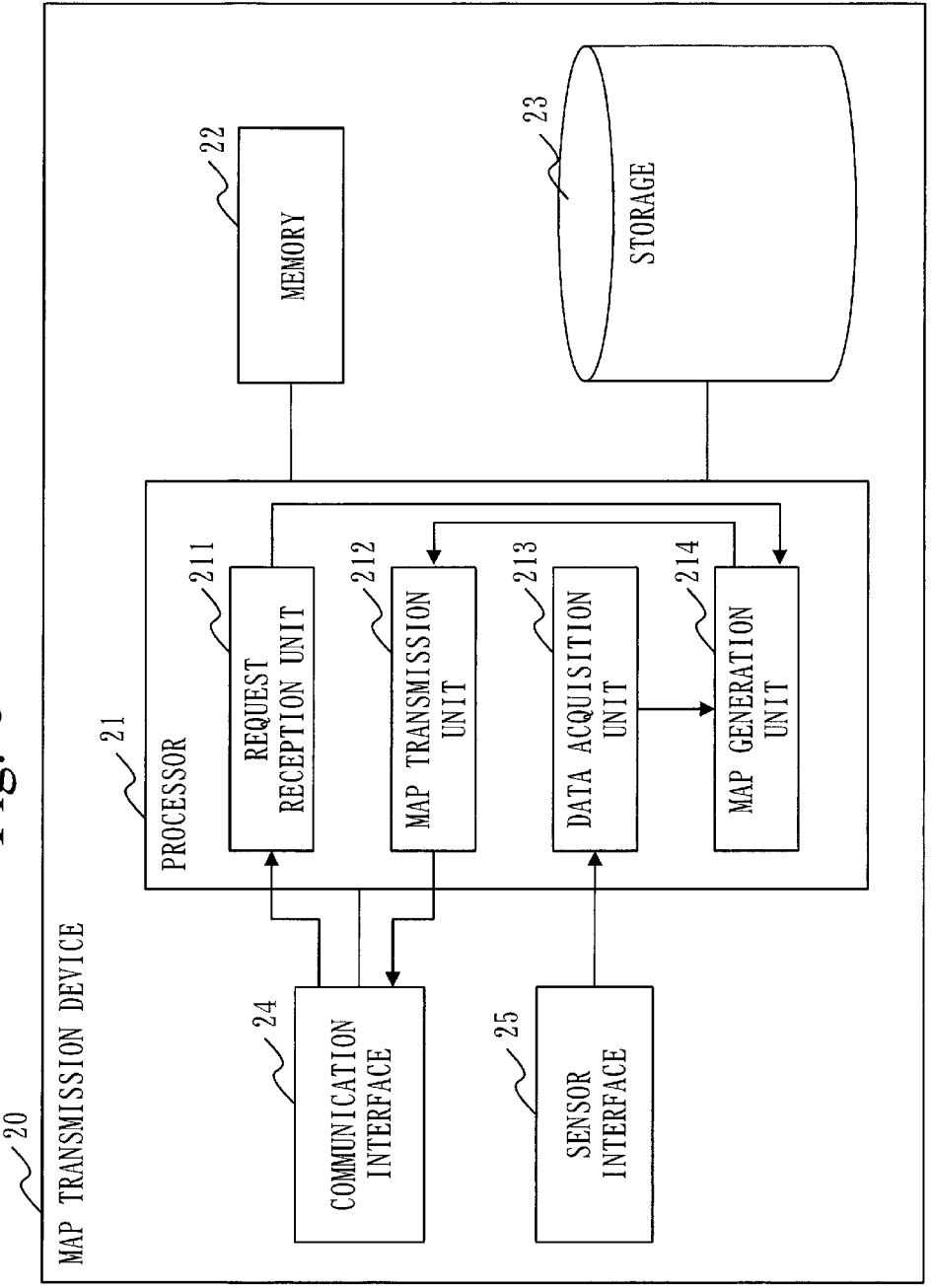
FIG. 3 is a configuration diagram of a map transmission device 20 according to Embodiment 1.

Likewise, FIG. 3 illustrates only one processor 21. However, the map transmission device 20 may be provided with a plurality of processors that replace the processor 21. The plurality of processors share execution of the program that implements the functions of the request reception unit 211, map transmission unit 212, data acquisition unit 213, and map generation unit 214.

Each processor is an IC which performs processing just as the processor 11 is.

*Description of Operation*

The operation of the driving assistance system 1 according to Embodiment 1 will be described with referring to FIGS. 4 to 9.

The operation of the driving assistance system 1 according to Embodiment 1 corresponds to a driving assistance method according to Embodiment 1. The operation of the driving assistance system 1 according to Embodiment 1 also corresponds to processing of a driving assistance program according to Embodiment 1.

Figure 4:
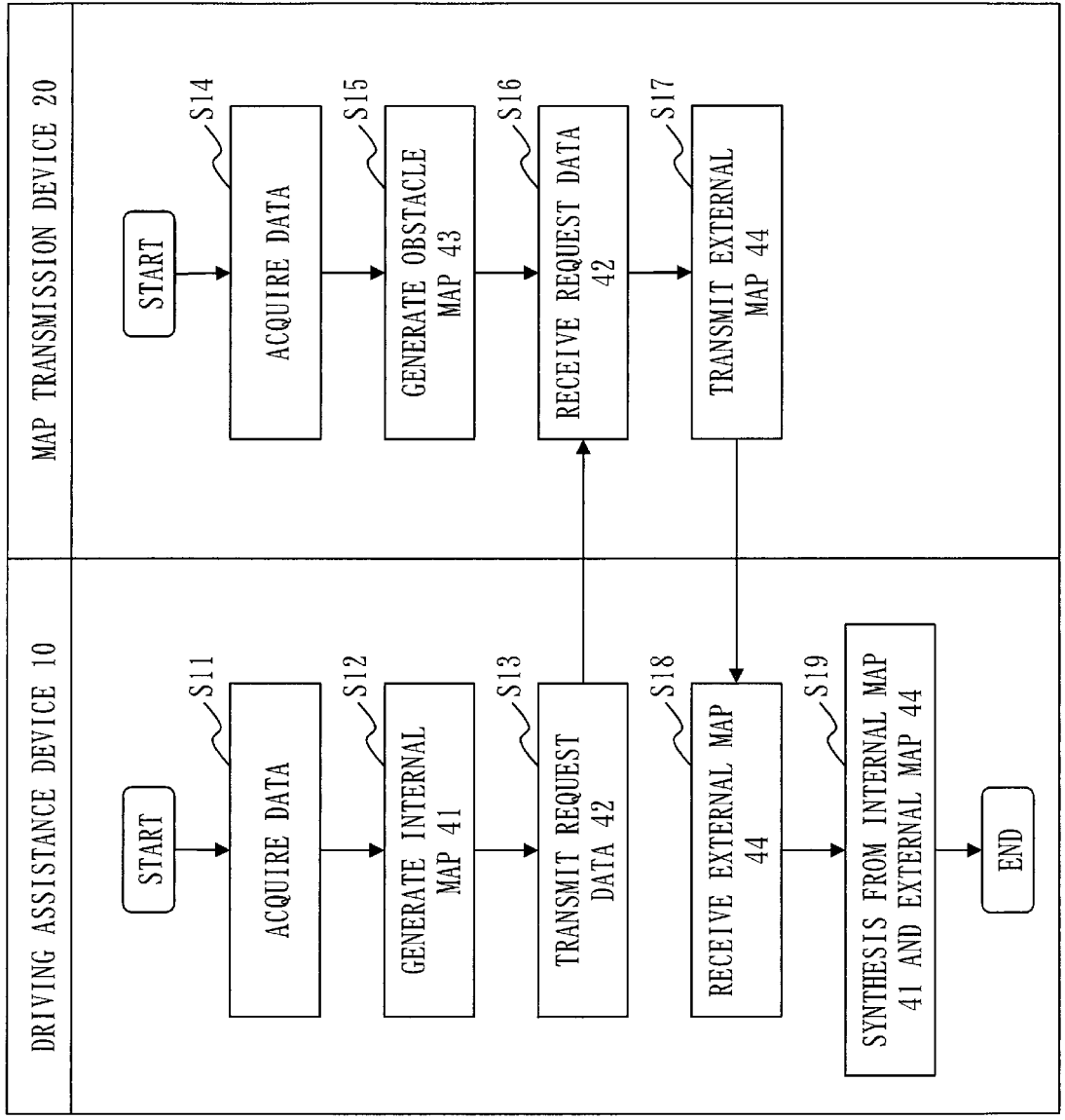
FIG. 4 is a flowchart illustrating an overall operation of the driving assistance system 1 according to Embodiment 1.

The overall operation of the driving assistance system 1 according to Embodiment 1 will be described with referring to FIG. 4.

(Step S11: First Data Acquisition Process)

The data acquisition unit 113 of the driving assistance device 10 acquires data acquired by the sensor mounted in the mobile body 31, via the sensor interface 15, and acquires data flowing in a network such as a CAN (Controller Area Network) within the mobile body 31, via the communication interface 14.

According to a specific example, the data acquisition unit 113 acquires: obstacle data acquired by the sensor such as the millimeter-wave radar, sonar, and camera and concerning an obstacle on the periphery of the mobile body 31; position data received by the positioning signal receiver and indicating the position of the mobile body 31; weather data acquired by the sensor such as the rain sensor and concerning the weather around the mobile body 31; a mobile body data such as a moving speed of the mobile body 31 and flowing in the network within the mobile body 31; and route data indicating a moving route of the mobile body 31. The data acquisition unit 113 may acquire the weather data from the Internet via the communication interface 14. The data acquisition unit 113 writes the obstacle data, position data, weather data, and route data to the memory 12.

(Step S12: First Map Generation Process)

The map generation unit 114 of the driving assistance device 10 generates an obstacle map indicating obstacles on the periphery of the mobile body 31, as an internal map 41 with using the obstacle data and position data acquired in step S11. The map generation unit 114 writes the internal map 41 to the memory 12. The map generation unit 114 generates the internal map 41 based on the absolute coordinate system.

The internal map 41 includes an obstacle ID being an identifier of the obstacle, a detection time at which the obstacle is detected, a position of the obstacle and an accuracy of the position, a speed of the obstacle and an accuracy of the speed, and a size (width, height, and depth) of the obstacle and an accuracy of the size. The internal map 41 also includes a position of the mobile body 31 and an accuracy of the position, a speed of the mobile body 31 and an accuracy of the speed, a vehicle ID if the vehicle ID being an identifier is attached to the mobile body 31, an azimuth of the mobile body 31 and an accuracy of the azimuth, a yaw rate of the mobile body 31 and an accuracy of the yaw rate, and a size (car length) of the mobile body 31 and an accuracy of the size.

(Step S13: Request Transmission Process)

The request transmission unit 111 of the driving assistance device 10 transmits request data 42 according to the moving speed indicated by the mobile body data acquired in step S11, of the mobile body 31 to the map transmission device 20 mounted in the mobile body 32 which is a peripheral body being present on the periphery of the mobile body 31, via the communication interface 14.

(Step S14: Second Data Acquisition Process)

The data acquisition unit 213 of the map transmission device 20 acquires the data acquired by the sensor mounted in the mobile body 32, via the sensor interface 25.

According to a specific example, the data acquisition unit 213 acquires obstacle data acquired by the sensor such as the millimeter-wave radar, sonar, and camera and concerning an obstacle on the periphery of the mobile body 32. The data acquisition unit 213 also acquires position data indicating the position of the mobile body 32 in which the map transmission device 20 is mounted. The data acquisition unit 213 writes the obstacle data and position data to the memory 22.

(Step S15: Second Map Generation Process)

The map generation unit 214 of the map transmission device 20 generates an obstacle map 43 indicating an obstacle on the periphery of the mobile body 32 with using the obstacle data and position data acquired in step S14. The map generation unit 214 writes the obstacle map 43 to the memory 22. The map generation unit 214 generates the obstacle map 43 based on the absolute coordinate system.

The obstacle map 43 includes the same types of data as those of the internal map 41.

(Step S16: Request Reception Process)

The request reception unit 211 of the map transmission device 20 receives the request data 42 transmitted in step S11 and according to the moving speed of the mobile body, via the communication interface 24.

(Step S17: Map Transmission Process)

The map transmission unit 212 of the map transmission device 20 transmits, of the obstacle map 43 generated in step S15, the obstacle map 43 indicating an obstacle within the range according to the request data 42 received in step S16 to the mobile body 31 as an external map 44.

Specifically, the map transmission unit 212 reads the obstacle map 43 from the memory 12. The map transmission unit 212 extracts data on the obstacle within the range according to the request data 42 and data on the mobile body 32 from the obstacle map 43, and treats the extracted data as the external map 44. The map transmission unit 212 then transmits the external map 44 to the driving assistance device 10 mounted in the mobile body 31, via the communication interface 24.

(Step S18: Map Reception Process)

The map reception unit 112 of the driving assistance device 10 receives the external map 44 transmitted in step S17, from the map transmission device 20 mounted in the mobile body 32 being a peripheral body. The map reception unit 112 writes the external map 44 to the memory 12.

(Step S19: Map Synthesis Process)

The map synthesis unit 115 of the driving assistance device 10 generates a synthesis map 45 by synthesis from the internal map 41 generated in step S12 and the external map 44 received in step S18.

Specifically, the map synthesis unit 115 reads the internal map 41 and the external map 44 from the memory 12. The map synthesis unit 115 adds data of the external map 44 to the internal map 41, thereby generating the synthesis map 45. As the internal map 41 and the external map 44 are both generated based on the absolute coordinate system, the data of the external map 44 can be simply added to the internal map 41. The map synthesis unit 115 writes the synthesis map 45 to the memory 12.

Figure 5:
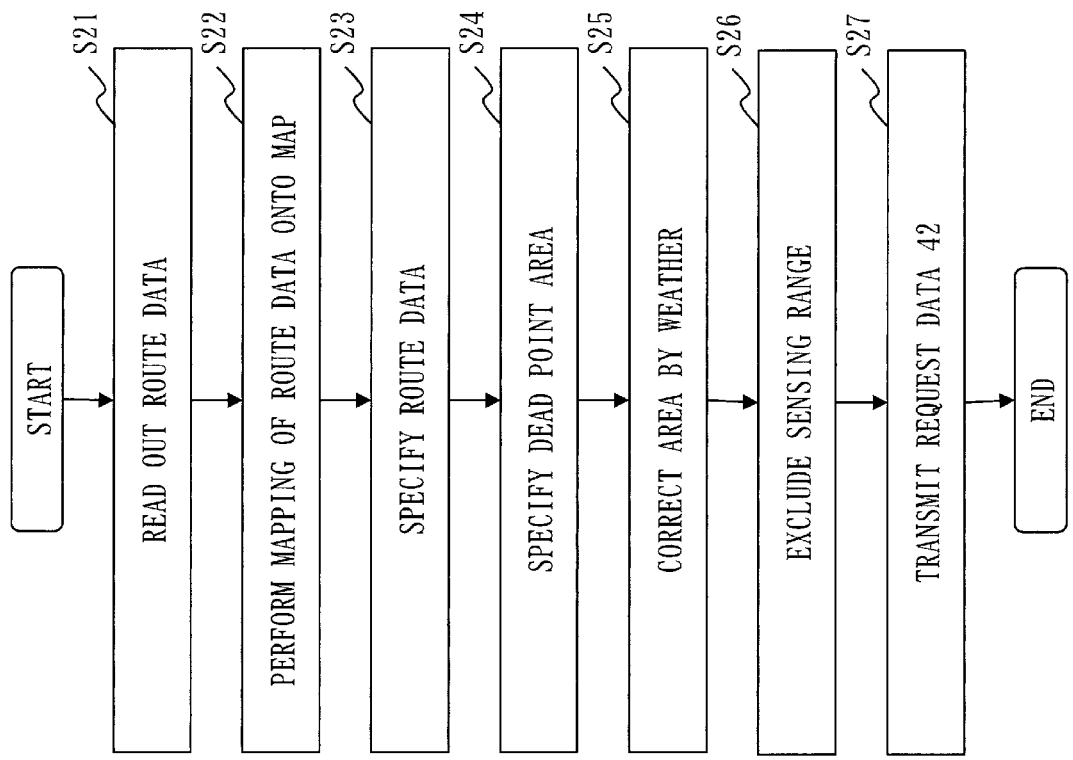
FIG. 5 is a flowchart of a request transmission process according to Embodiment 1.
Figure 6:
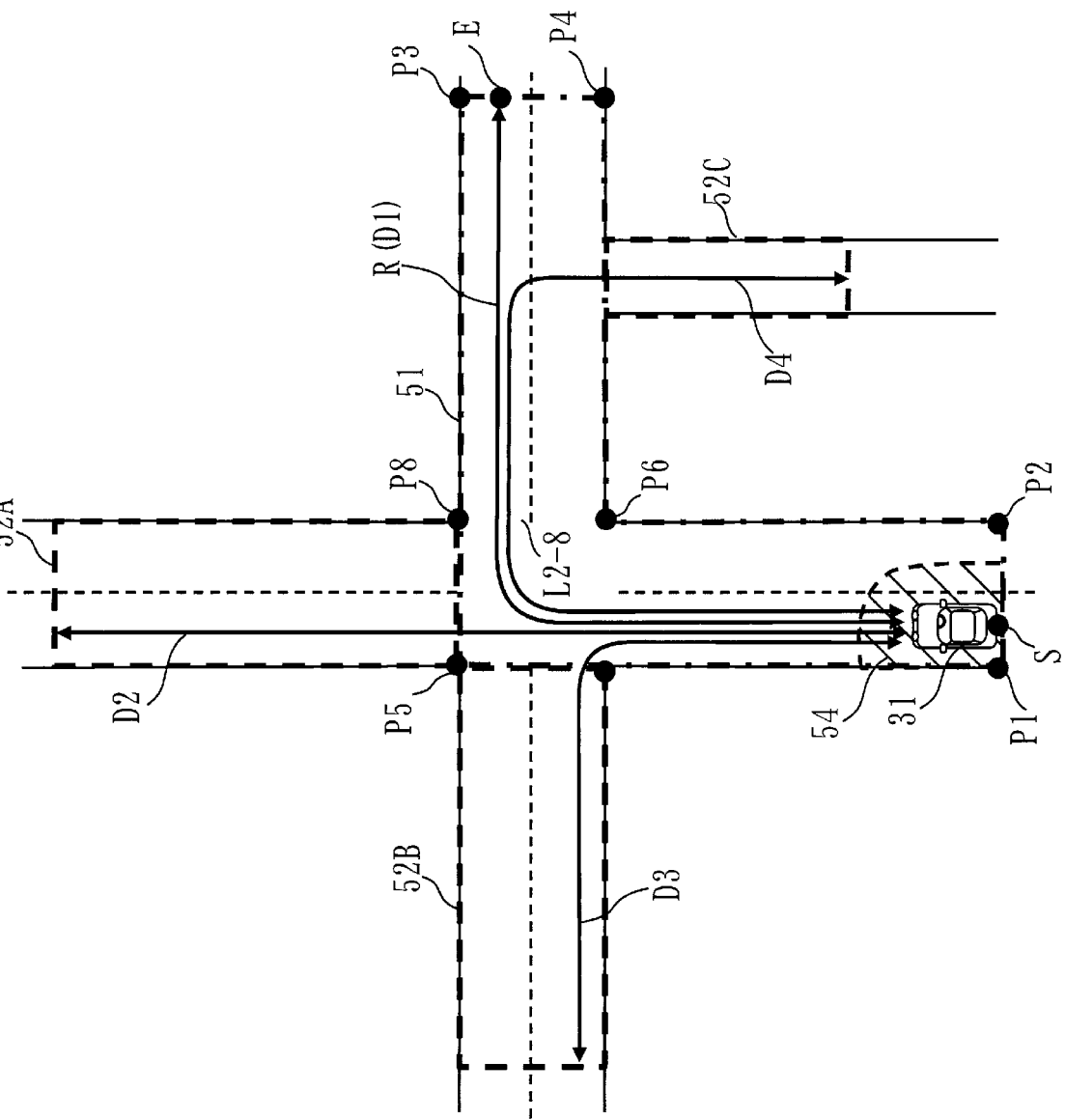
FIG. 6 is an explanatory diagram of the request transmission process according to Embodiment 1.

A request transmission process (step S13 of FIG. 4) according to Embodiment 1 will be described with referring to FIGS. 5 and 6.

(Step S21: Route Data Readout Process)

The request transmission unit 111 reads, of the route data acquired in step S11, route data corresponding to movement within a preset time X of the mobile body 31 from the memory 12. In Embodiment 1, the route data expresses the moving route of the mobile body 31 using a start point and an end point, and a coefficient of a cubic curve. The start point is the position of the mobile body 31 indicated by the position data acquired in step S11.

The preset time X is a time predetermined for each mobile body 31. As the preset time X is determined for each mobile body 31, the distance of the readout route data changes according to the moving speed of the mobile body 31. That is, the higher the moving speed, the longer the distance of the readout route data; the lower the moving speed, the shorter the distance of the readout route data. As the preset time X, for example, a time during which the mobile body 31 can be safely braked is set.

(Step S22: Mapping Process)

The request transmission unit 111 reads map data of a vicinity of the start point from the map storing unit 131. The request transmission unit 111 generates a route map by mapping the route data read out in step S21 onto the readout map data.

For example, the request transmission unit 111 expresses a moving route R as a set of dots which are passed through. The request transmission unit 111 embeds the set of dots indicating the moving route R in the map data, thereby mapping the route data.

(Step S23: Route Area Specifying Process)

The request transmission unit 111 specifies a route area 51 indicating a road where the moving route R runs, with using the route map generated in step S22. In FIG. 6, the route area 51 is a range surrounded by an alternate long and short dashed line.

Specifically, the request transmission unit 111 specifies, of the road where the moving route R runs, a road portion extending from a start point S to an end point E as the route area 51. Regarding this, if there is an opposite lane on the road where the moving route R runs, the request transmission unit 111 specifies the range including the opposite lane as the route area 51.

More specifically, the request transmission unit 111 specifies crossing points P1 and P2 of a feature and perpendiculars to the moving route R extending through the start point S of the moving route R. The request transmission unit 111 also specifies crossing points P3 and P4 of a feature and perpendiculars to the moving route R extending through the end point E of the moving route R. If the road where the moving route R runs has a right turn, a left turn, or a branch, the request transmission unit 111 specifies crossing points P5 and P6 of a feature and perpendiculars to the moving route R running through the right turn position, the left turn position, or the branch position. The request transmission unit 111 then specifies an area corresponding to the width of a road including the specified crossing points P1 to P6, as the route area 51. If the road includes an opposite lane, the road width is a width including the opposite lane.

In Embodiment 1, the request transmission unit 111 expresses the boundary of the specified route area 51 as a set of dots on the absolute coordinate system.

(Step S24: Blind Spot Area Specifying Process)

The request transmission unit 111 specifies a blind spot area 52 with using the route map generated in step S22. The blind spot area 52 does not signify an area that cannot be seen from the driver of the mobile body 31 but is a range, outside the route area 51, where an obstacle that might collide against the mobile body 31 is present. In FIG. 6, the blind spot area 52 includes three blind spot areas 52A to 52C which are ranges respectively surrounded by broken lines.

Specifically, the request transmission unit 111 specifies a road adjacent to the road where the moving route R runs, with using the route map. The request transmission unit 111 specifies, of the specified adjacent road, a road extending to positions whose distances from the start point S are the same as a distance from the start point S to the end point E, as the blind spot area 52. Namely, in FIG. 6, a distance D1, a distance D2, a distance D3, and a distance D4 are of the same distance. Regarding this, if the adjacent road includes an opposite lane, the request transmission unit 111 specifies the range including the opposite lane, as the blind spot area 52.

Figure 7:
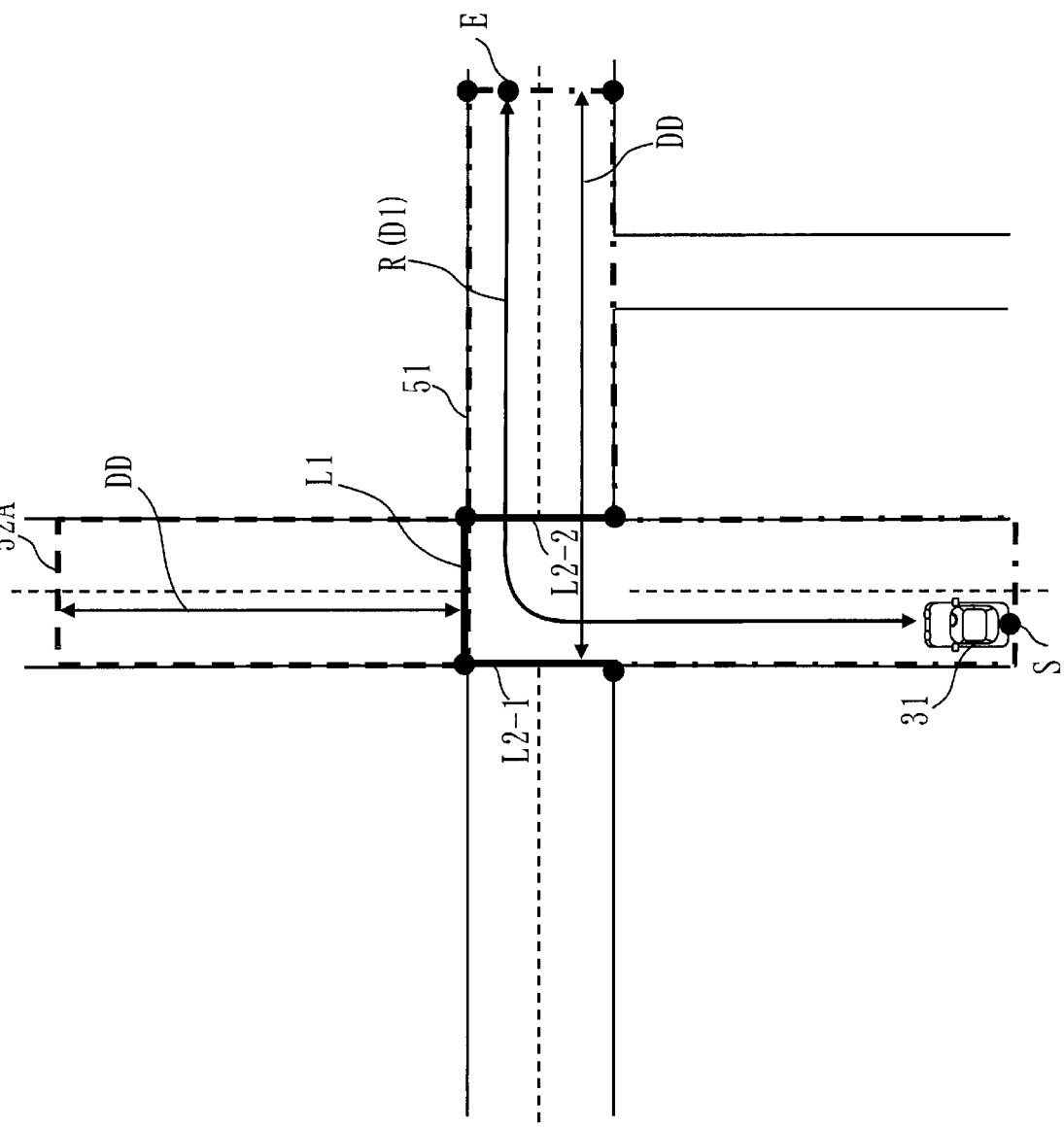
FIG. 7 is an explanatory diagram of how to identify a blind spot area 52A according to Embodiment 1.

In other words, as illustrated in FIG. 7, concerning the adjacent road, the request transmission unit 111 specifies an adjacent line L1 to the road where the moving route R runs. The request transmission unit 111 specifies a perpendicular line L2 extending through a terminal point of the adjacent line L1 and perpendicular to the traveling direction indicated by the moving route R. If the adjacent line L1 is perpendicular to the traveling direction of the moving route R, only one perpendicular line L2 is specified. If the adjacent line L1 is not perpendicular to the traveling direction of the moving route R, two perpendicular lines L2 are specified. In FIG. 7, two perpendicular lines of a perpendicular line L2-1 and a perpendicular line L2-2 are specified.

The request transmission unit 111 calculates a distance DD from, out of the specified perpendicular lines L2, the perpendicular line L2 (the perpendicular line L2-1 in FIG. 7) which is farther from the end point E to the perpendicular line to the moving route R extending through the end point E, along the moving route R. The request transmission unit 111 treats, of the adjacent road, only a range extending from the adjacent line L1 for the distance DD, as the blind spot area 52.

In Embodiment 1, the request transmission unit 111 expresses the boundary of the blind spot area 52 as a set of dots on the absolute coordinate system, in the same manner as with the route area 51.

(Step S25: Area Correction Process)

The request transmission unit 111 corrects the route area 51 specified in step S23 and the blind spot area 52 specified in step S24 by a coefficient corresponding to the weather indicated by the weather data acquired in step S11.

Specifically, the processor 11 reads the coefficient corresponding to the weather indicated by the weather data from the coefficient storing unit 133. The request transmission unit 111 multiplies the distance of the moving route R by the readout coefficient, thereby correcting the distance of the moving route R. The request transmission unit 111 corrects the range of the route area 51 and the range of the blind spot area 52 in accordance with the corrected distance of the moving route R.

For example, the braking distance is longer in rainy weather than in fine weather. Thus, correction is performed such that the distance of the moving route R is longer and the ranges of the route area 51 and blind spot area 52 are wider in rainy weather than in fine weather.

(Step S26: Sensing Range Excluding Process)

The request transmission unit 111 reads the sensing range of the sensor mounted in the mobile body 31 from the sensing range storing unit 132. The request transmission unit 111 specifies, as a necessary area 53, a range obtained by excluding the sensing range from a sum area of the route area 51 and blind spot area 52 corrected in step S25.

Figure 8:
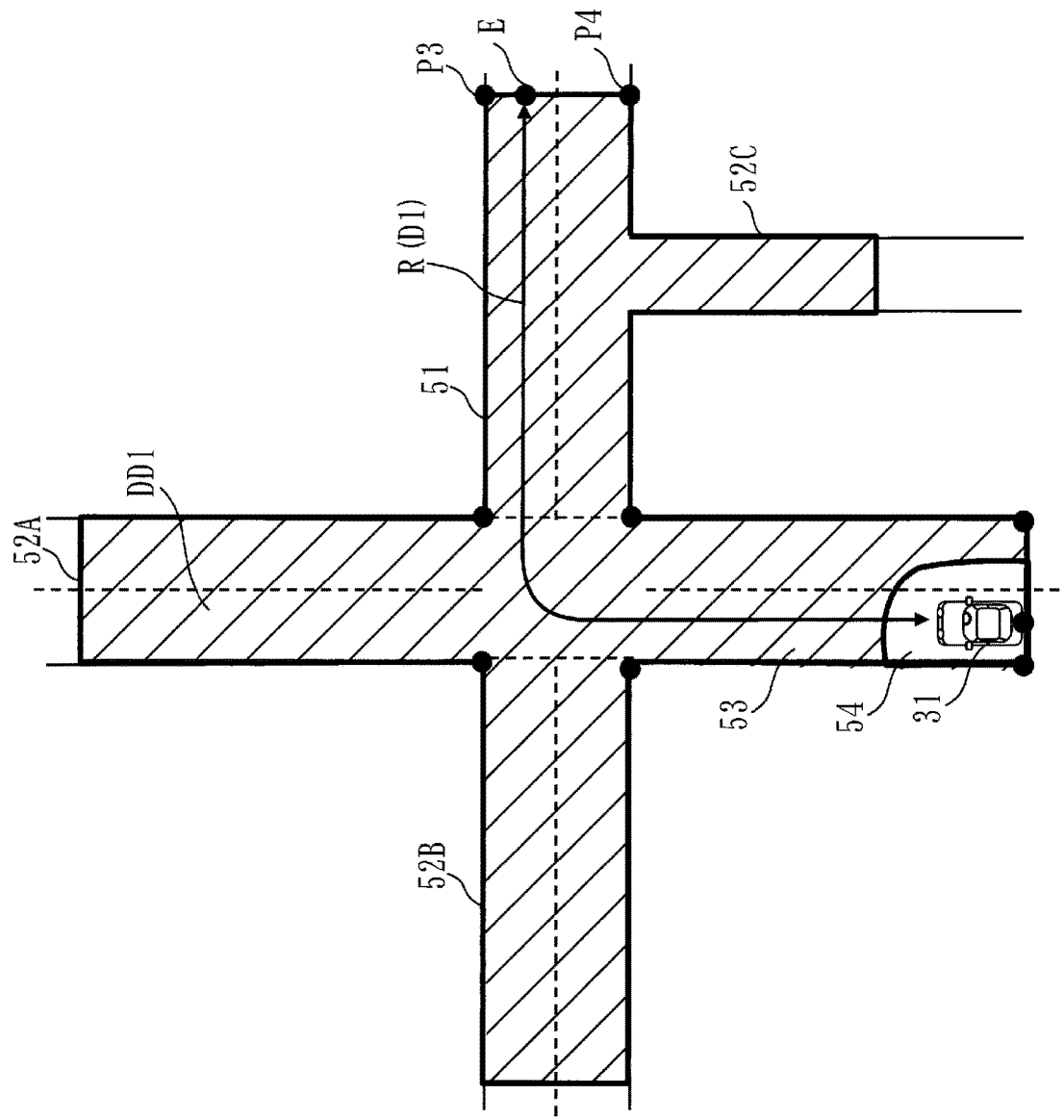
FIG. 8 is an explanatory diagram of a necessary area 53 according to Embodiment 1.

More precisely, the sensing range is expressed by the relative coordinates using the position of the mobile body 31 as a reference. Hence, the request transmission unit 111 converts the sensing range into absolute coordinates with using the position indicated by the position data acquired in step S11 as a reference. The request transmission unit 111 calculates the crossing points of the sensing range as converted into the absolute values and the feature on the route map, and specifies a range formed by connecting the crossing points, as an actual sensing range 54. As illustrated in FIG. 8, the request transmission unit 111 specifies, as the necessary area 53, a range obtained by excluding the actual sensing range 54 from the sum area of the route area 51 and blind spot area 52 corrected in step S27.

That is, the necessary area 53 is a range obtained by correcting an area that can be reached at a moving speed within the preset time X by the weather data and excluding the actual sensing range 54 from the corrected range.

(Step S27: Request Data Transmission Process)

The request transmission unit 111 transmits the request data 42 indicating the necessary area 53 specified in step S26 to the map transmission device 20 via the communication interface 14.

Figure 9:
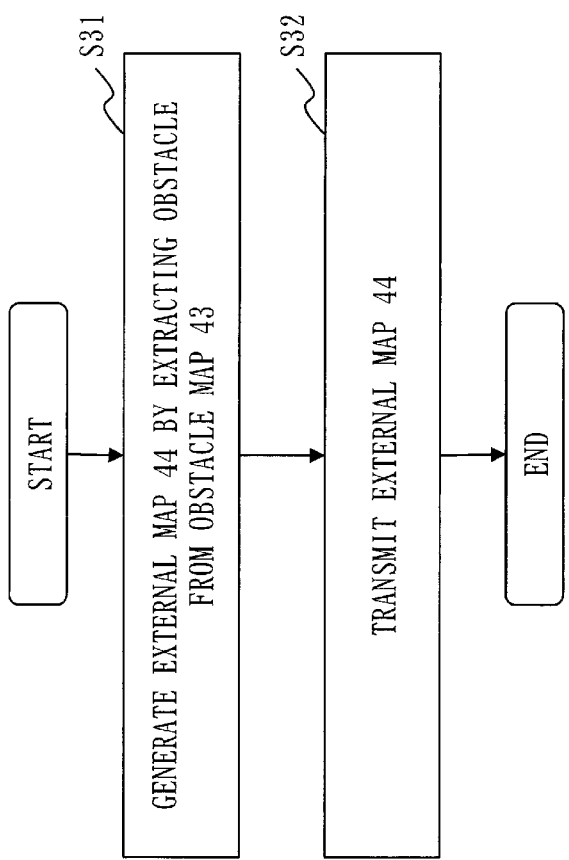
FIG. 9 is a flowchart of a map transmission process according to Embodiment 1.

The map transmission process (step S17 of FIG. 4) according to Embodiment 1 will be described with referring to FIG. 9.

(Step S31: External Map Generation Process)

The map transmission unit 212 generates the external map 44 by extracting, from the obstacle map 43 generated in step S15, a portion indicating an obstacle included in the range indicated by the necessary area 53 which is indicated by the request data 42 transmitted in step S27.

Specifically, the map transmission unit 212 specifies, out of obstacles included in the obstacle map 43 generated in step S15, an obstacle whose position is included in the range indicated by the necessary area 53. The map transmission unit 212 generates the external map 44 by extracting information on the specified obstacle.

(Step S32: External Map Transmission Process)

The map transmission unit 212 transmits the external map 44 generated in step S31 to the mobile body 31.

\*\*\*Effect of Embodiment 1\*\*\*

As described above, in the driving assistance system 1 according to Embodiment 1, the driving assistance device 10 mounted in the mobile body 31 transmits the request data 42 according to the moving speed of the mobile body 31, and receives the obstacle map 43 indicating the obstacle within the range according to the request data 42, as the external map 44. Hence, information of the obstacle within an appropriate range according to the moving speed of the mobile body 31 can be acquired. That is, instead of transmitting information of an obstacle within a range statically predetermined such as an intersection to all driving assistance devices 10 equally, only information of an obstacle within an appropriate range according to the moving speed of the mobile body 31 in which the driving assistance device 10 is mounted can be transmitted to the driving assistance device 10.

Particularly, in the driving assistance system 1 according to Embodiment 1, the driving assistance device 10 mounted in the mobile body 31 transmits the request data 42 indicating the necessary area 53 being a range that can be reached at the moving speed within the preset time X, and receives the obstacle map 43 indicating the obstacle within the range indicated by the necessary area 53, as the external map 44. Therefore, information of the obstacle within the range according to the moving speed of the mobile body 31 and where safe braking cannot possibly be performed can be acquired.

In the driving assistance system 1 according to Embodiment 1, the sensing area of the sensor mounted in the mobile body 31 is excluded from the necessary area 53. Hence, obstacle information from which information of an obstacle that can be detected by the sensor mounted in the mobile body 31 is excluded can be acquired.

In the driving assistance system 1 according to Embodiment 1, the route area 51 and blind spot area 52 from which the necessary area 53 derives are corrected based on the weather data. Hence, fluctuations in braking distance and so on caused by the weather are reflected in the necessary area 53, so that information of an obstacle within an appropriate range can be acquired.

\*\*\*Other Configurations\*\*\*

<Modification 1>

In Embodiment 1, the moving route of the mobile body 31 is acquired externally. However, the moving route of the mobile body 31 may be calculated by the driving assistance device 10.

<Modification 2>

In Embodiment 1, the route area 51 and blind spot area 52 from which the necessary area 53 derives are corrected based on the weather data. However, if the fluctuations in braking distance and so on caused by the weather are small, or if the preset time X is determined to involve a certain amount of margin, the route area 51 and blind spot area 52 from which the necessary area 53 derives need not be corrected based on the weather data.

<Modification 3>

In Embodiment 1, the sensing range of the sensor mounted in the mobile body 31 is excluded from the necessary area 53. However, the sensing range of the sensor mounted in the mobile body 31 may be included in the necessary area 53. Then, it may be possible to obtain information of an obstacle which, although being present in the sensing range of the sensor mounted in the mobile body 31, was not detected by the sensor mounted in the mobile body 31.

<Modification 4>

In Embodiment 1, the driving assistance device 10 acquires the external map 44 from the map transmission device 20 mounted in a peripheral body (the mobile body 32 and the road side apparatus 33) being present on the periphery of the mobile body 31. However, in cases where a large number of peripheral bodies are present on the periphery of the mobile body 31, if external maps 44 are acquired from the map transmission devices 20 mounted in all the peripheral bodies, this may take up a large portion of the communication band.

In view of this, the driving assistance device 10 may limit the peripheral bodies from which the external maps 44 are acquired, in the following manner. First, prior to transmitting the request data 42 in step S13, the request transmission unit 111 transmits confirmation packets to the peripheral bodies being present on the periphery of the mobile body 31, and receives response packets from peripheral bodies that have received the confirmation packets. Then, the request transmission unit 111 transmits the request data 42 only to the peripheral bodies being the senders of some of the response packets that have been received early. For example, the request transmission unit 111 transmits the request data 42 only to the peripheral body being the sender of the response packet that has been received the first.

This can reduce the communication traffic. If the objects from which the external maps 44 are acquired are reduced, however, the information of the obstacle may become insufficient. That is, the fewer the objects from which the external maps 44 are acquired, the smaller the communication traffic, but the information of the obstacle may become insufficient. Inversely, the more the objects from which the external maps 44 are acquired, the larger the communication traffic, but the information of the obstacle may become substantial.

<Modification 5>

In Embodiment 1, the functions of the request transmission unit 111, map reception unit 112, data acquisition unit 113, map generation unit 114, and map synthesis unit 115 of the driving assistance device 10 are implemented by software. The functions of the request reception unit 211, map transmission unit 212, data acquisition unit 213, and map generation unit 214 of the map transmission device 20 are implemented by software. However, as Modification 5, the functions of the request transmission unit 111, map reception unit 112, data acquisition unit 113, map generation unit 114, map synthesis unit 115, request reception unit 211, map transmission unit 212, data acquisition unit 213, and map generation unit 214 may be implemented by hardware. Differences of Modification 5 from Embodiment 1 will be described.

Figure 10:
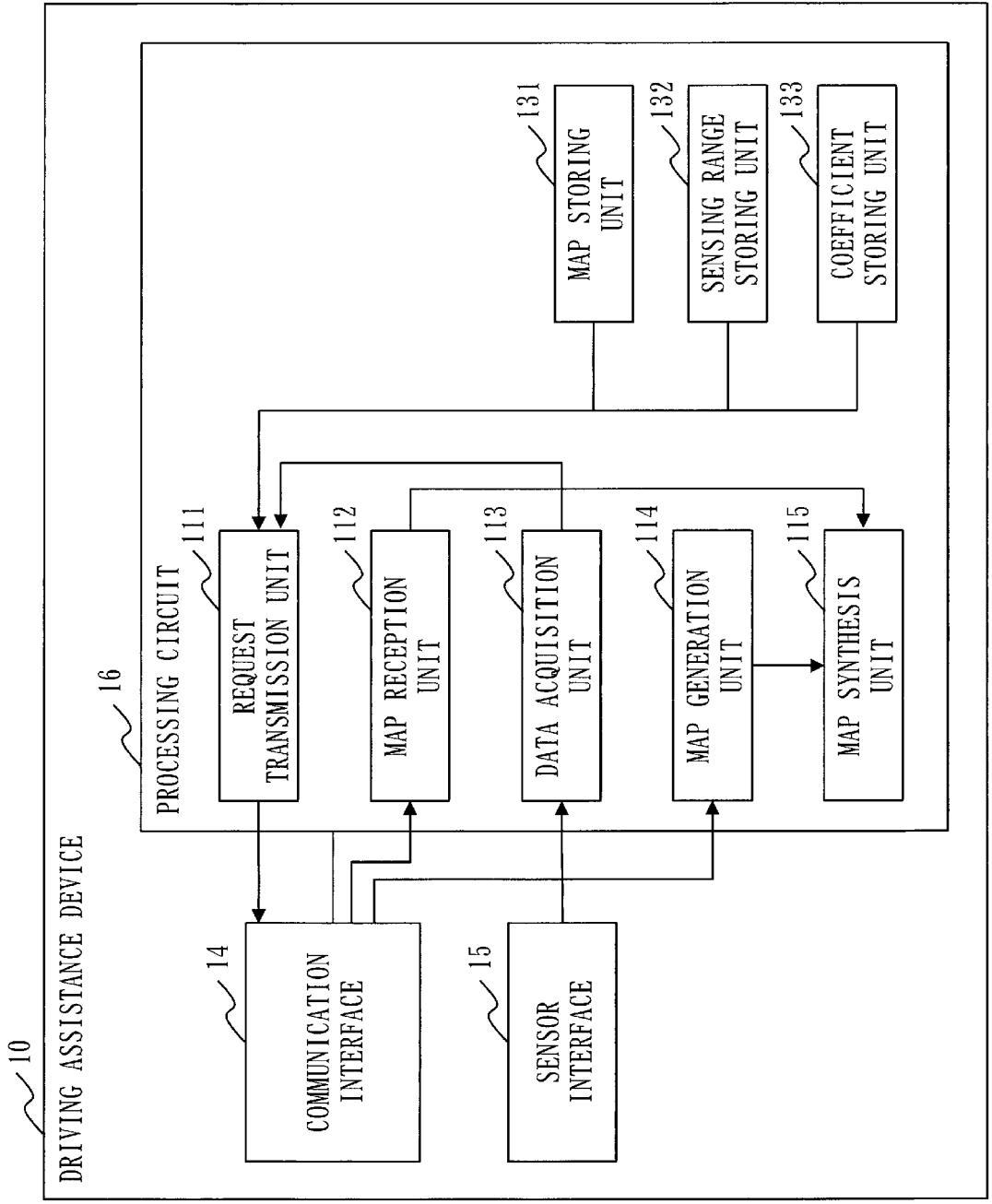
FIG. 10 is a configuration diagram of a driving assistance device 10 according to Modification 5.

A configuration of a driving assistance device 10 according to Modification 5 will be described with referring to FIG. 10.

In cases where the functions of a request transmission unit 111, map reception unit 112, data acquisition unit 113, map generation unit 114, and map synthesis unit 115 are implemented by hardware, the driving assistance device 10 is provided with a processing circuit 16 in place of the processor 11, the memory 12, and the storage 13. The processing circuit 16 is a dedicated electronic circuit to implement the functions of the request transmission unit 111, map reception unit 112, data acquisition unit 113, map generation unit 114, and map synthesis unit 115, and the functions of the memory 12 and storage 13.

Figure 11:
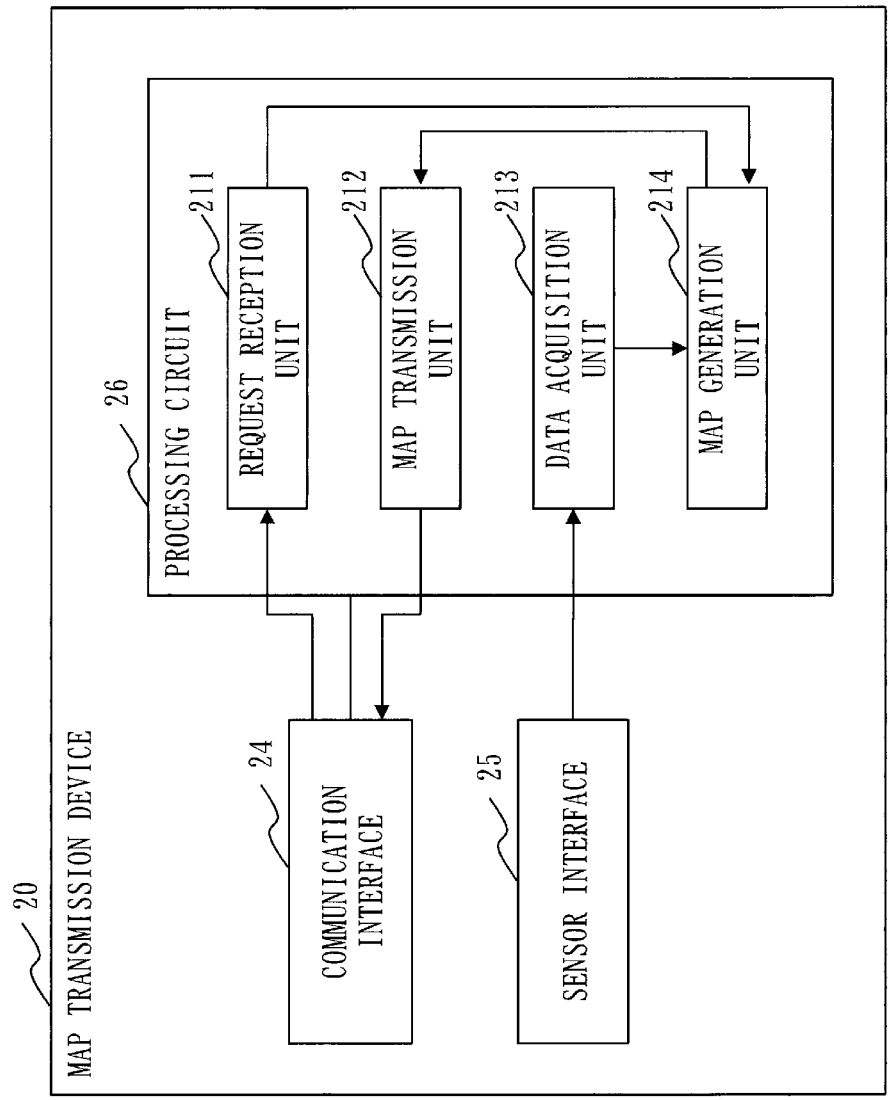
FIG. 11 is a configuration diagram of a map transmission device 20 according to Modification 5.

A configuration of a map transmission device 20 according to Modification 5 will be described with referring to FIG. 11.

In cases where the functions of a request reception unit 211, map transmission unit 212, data acquisition unit 213, and map generation unit 214 are implemented by hardware, the map generation unit 214 is provided with a processing circuit 26 in place of the processor 11, the memory 12, and the storage 13. The processing circuit 26 is a dedicated electronic circuit to implement the functions of the request reception unit 211, map transmission unit 212, data acquisition unit 213, and map generation unit 214, and the functions of the memory 22 and storage 23.

As examples of the processing circuits 16 and 26, a single circuit, a composite circuit, a programmed processor, a parallel-programmed processor, a logic IC, a GA (Gate Array), an ASIC (Application Specific Integrated Circuit), and an FPGA (Field-Programmable Gate Array) are assumed.

The functions of the request transmission unit 111, map reception unit 112, data acquisition unit 113, map generation unit 114, and map synthesis unit 115 may be implemented by one processing circuit 16, or the functions of the request transmission unit 111, map reception unit 112, data acquisition unit 113, map generation unit 114, and map synthesis unit 115 may be dispersed among and implemented by a plurality of processing circuits 16. Likewise, the functions of the request reception unit 211, map transmission unit 212, data acquisition unit 213, and map generation unit 214 may be implemented by one processing circuit 26, or the functions of the request reception unit 211, map transmission unit 212, data acquisition unit 213, and map generation unit 214 may be dispersed among and implemented by a plurality of processing circuits 26.

<Modification 6>

As Modification 6, some functions may be implemented by hardware, and the other functions may be implemented by software. Namely, of the functions of the request transmission unit 111, map reception unit 112, data acquisition unit 113, map generation unit 114, map synthesis unit 115, request reception unit 211, map transmission unit 212, data acquisition unit 213, and map generation unit 214, some functions may be implemented by hardware, and the other functions may be implemented by software.

The processors 11 and 21, the memories 12 and 22, the storages 13 and 23, and the processing circuits 16 and 26 will be collectively referred to as "processing circuitry". Namely, the functions of the respective functional constituent elements are implemented by the processing circuitry.

Embodiment 2

Embodiment 2 is different from Embodiment 1 in that a driving assistance device 10 transmits request data 42 indicating a braking distance and a braking time being a time taken until braking is completed, the moving speed and the braking time corresponding to a moving speed, to a mobile body 32 which is a peripheral body, and receives an external map 44 according to the request data 42. In Embodiment 2, this difference will be described, and a description on identical points with Embodiment 1 will be omitted.

*Description of Configuration*

Figure 12:
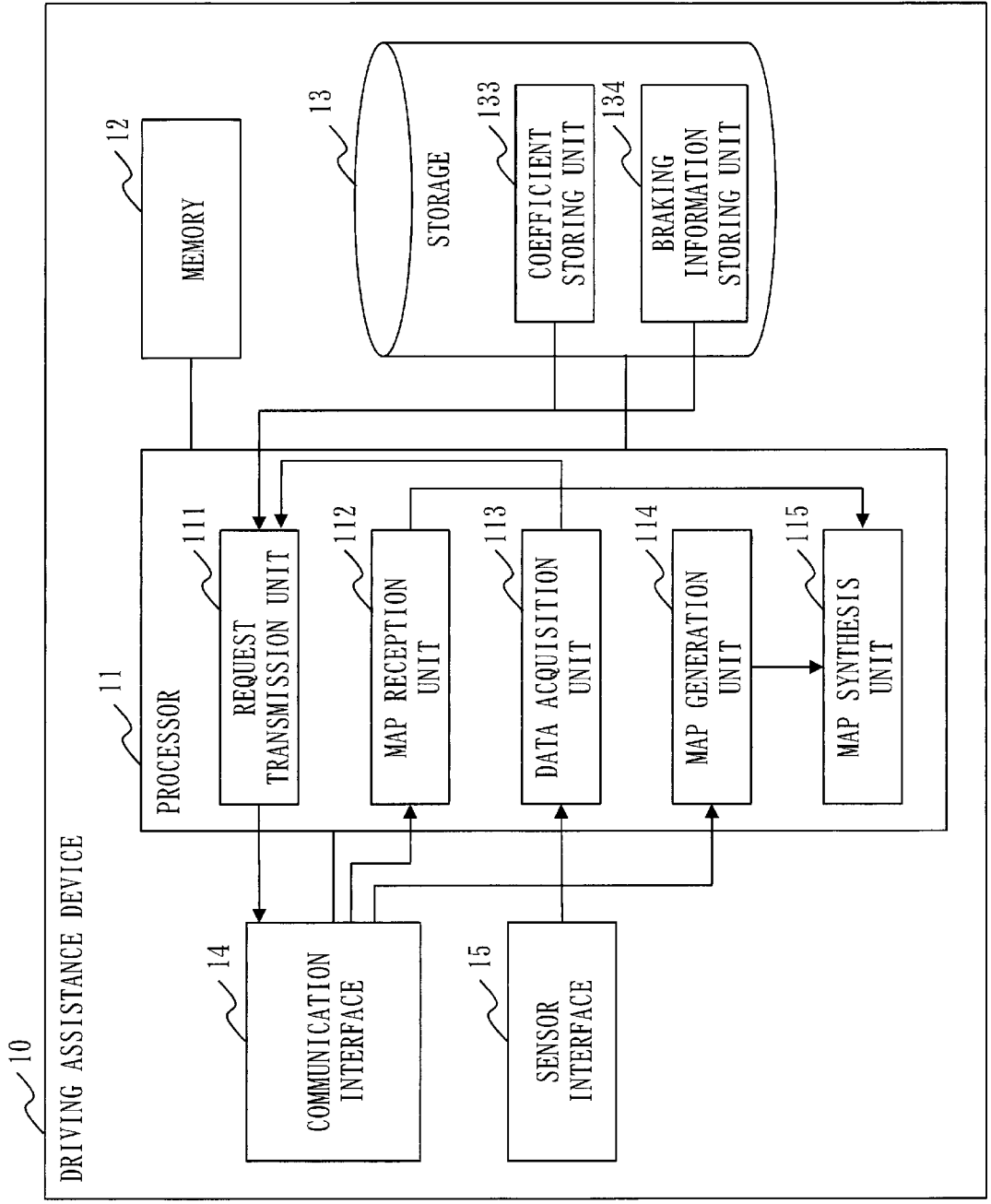
FIG. 12 is a configuration diagram of a driving assistance device 10 according to Embodiment 2.

A configuration of the driving assistance device 10 according to Embodiment 2 will be described with referring to FIG. 12.

A storage 13 implements the functions of a coefficient storing unit 133 and braking information storing unit 134.

The coefficient storing unit 133 stores coefficients of different weathers in the same manner as in Embodiment 1. The stored coefficients may be different from those of Embodiment 1.

The braking information storing unit 134 stores relations of the moving speed with the braking distance and the braking time. The braking time is the time taken until a mobile body 31 is stopped.

*Description of Operation*

Figure 13:
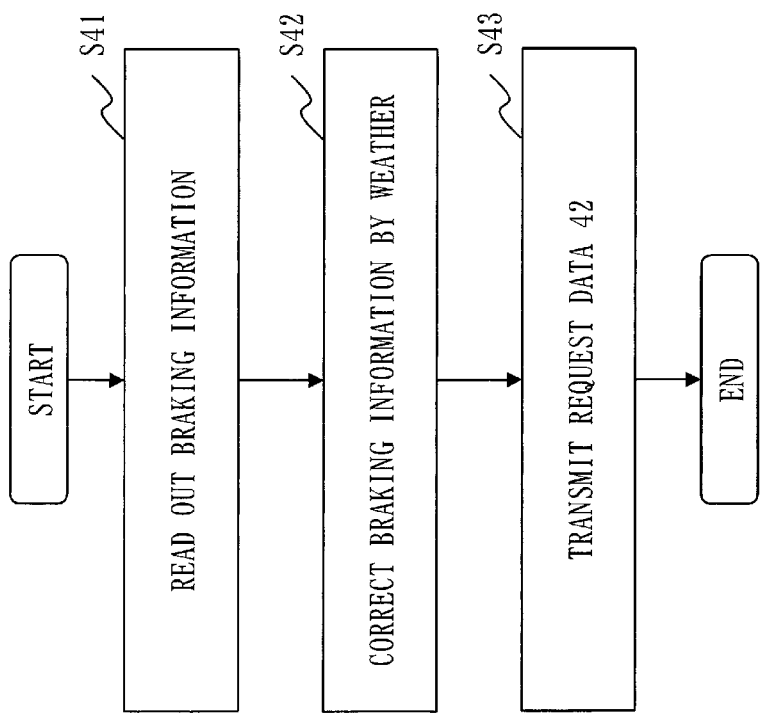
FIG. 13 is a flowchart of a request transmission process according to Embodiment 2.
Figure 14:
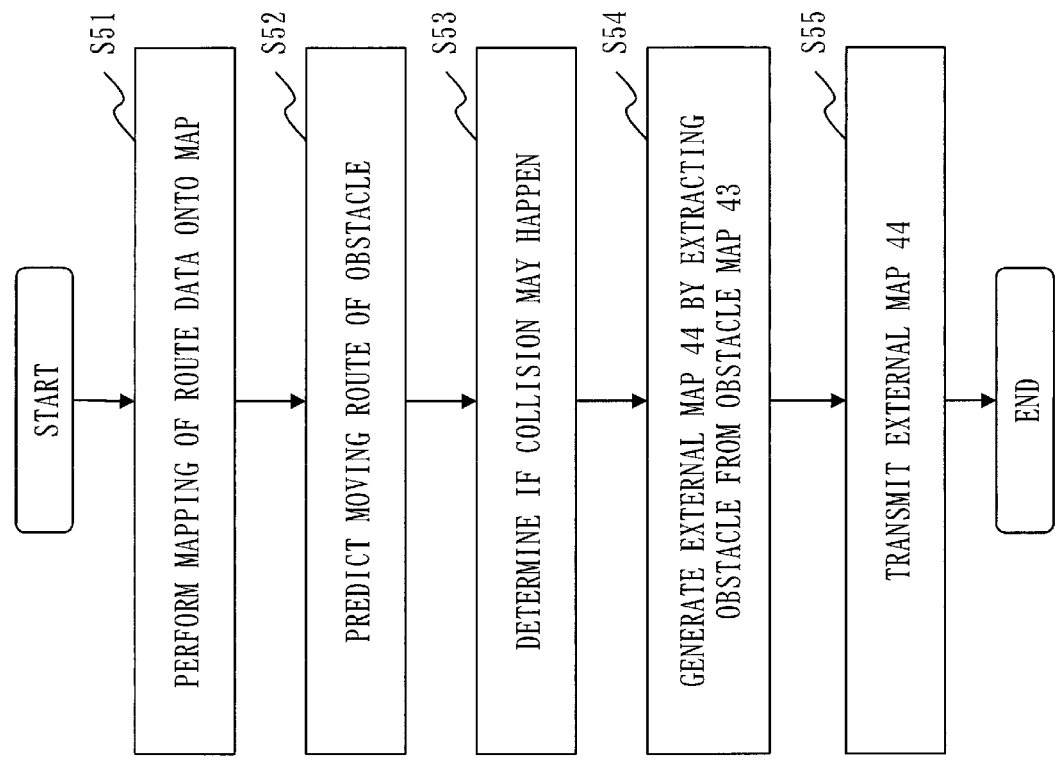
FIG. 14 is a flowchart of a map transmission process according to Embodiment 2.

The operation of a driving assistance system 1 according to Embodiment 2 will be described with referring to FIGS. 13 to 14.

The operation of the driving assistance system 1 according to Embodiment 2 corresponds to a driving assistance method according to Embodiment 2. The operation of the driving assistance system 1 according to Embodiment 2 corresponds to processing of a driving assistance program according to Embodiment 2.

A request transmission process (step S13 of FIG. 4) according to Embodiment 2 will be described with referring to FIG. 13.

(Step S41: Braking Information Readout Process)

A request transmission unit 111 reads out a braking distance and a braking time corresponding to the moving speed indicated by the mobile body data acquired in step S11 from the braking information storing unit 134.

(Step S42: Braking Information Correction Process)

The request transmission unit 111 corrects the braking distance and braking time read out in step S11 by a coefficient corresponding to the weather indicated by weather data acquired in step S11.

Specifically, the request transmission unit 111 reads out the coefficient corresponding to the weather indicated by the weather data from the coefficient storing unit 133. The request transmission unit 111 corrects the braking distance and braking time by multiplying the braking distance and braking time read out in step S41 by the readout coefficient.

(Step S43: Request Data Transmission Process)

The request transmission unit 111 transmits the request data 42 including: the braking distance and braking time corrected in step S42, the route data acquired in step S11, and position data acquired in step S11 to a map transmission device 20 via a communication interface 14. That is, the request transmission unit 111 transmits the request data 42 indicating: the braking distance and braking time, a moving route R of the mobile body 31, and the position of the mobile body 31.

The request transmission unit 111 extracts, out of the route data acquired in step S11, only route data corresponding to the braking distance that starts at the position indicated by the position, and transmits the extracted route data.

A map transmission process (step S17 of FIG. 4) according to Embodiment 2 will be described with referring to FIG. 14.

(Step S51: Mapping Process)

A map transmission unit 212 generates a route map by mapping the route data and position data included in the request data 42 over an obstacle map 43 generated in step S15.

For example, the map transmission unit 212 expresses a moving route R indicated by the route data as a set of dots to pass through, and expresses the positions of the mobile body 31 indicated by the position data by dots. The map transmission unit 212 then embeds the set of dots representing the moving route R and the dots representing the positions of the mobile body 31 into the obstacle map 43, thereby mapping the route data. The moving route R may be expressed by a curve. The positions of the mobile body 31 may be represented each by a dot and size (width, height, and depth).

(Step S52: Movement Prediction Process)

Concerning an obstacle included in the obstacle map 43 generated in step S15, the map transmission unit 212 predicts a moving route RO of until a lapse of the braking time included in the request data 42. A prior art may be employed to predict the moving route RO. For example, the map transmission unit 212 predicts the moving route RO of the obstacle based on the past moving history of the obstacle.

(Step S53: Intersection Determination Process)

Based on the moving route R indicated by the route data mapped in step S51 and the moving route RO predicted in step S52, the map transmission unit 212 determines whether or not the mobile body 31 and an obstacle might collide with each other.

Specifically, the map transmission unit 212 determines whether or not the moving route R indicated by the route data mapped in step S51 and the moving route RO predicted in step S52 intersect. That is, the map transmission unit 212 determines whether or not the mobile body 31 and the obstacle pass through the same point. If the mobile body 31 and the obstacle pass through the same point, the map transmission unit 212 determines that the mobile body 31 and the obstacle might collide with each other. If the mobile body 31 and the obstacle do not pass through the same point, the map transmission unit 212 determines that the mobile body 31 and the obstacle will not collide with each other.

(Step S54: External Map Generation Process)

The map transmission unit 212 generates the external map 44 by extracting information of, among obstacles included in the obstacle map 43 generated in step S15, an obstacle which is determined in step S53 that it might collide. If no obstacle is determined that it might collide, the map transmission unit 212 generates an external map 44 indicating that there is no obstacle.

(Step S55: External Map Transmission Process)

The map transmission unit 212 transmits the external map 44 generated in step S54 to the mobile body 31.

\*\*\*Effect of Embodiment 2\*\*\*

As described above, with the driving assistance system 1 according to Embodiment 2, the map transmission device 20 specifies an obstacle that might collide with the mobile body 31, according to the moving speed of the mobile body 31. The map transmission device 20 then transmits to the driving assistance device 10 only information of the obstacle that might collide. Therefore, the driving assistance device 10 can acquire only the information of the object that might collide.

\*\*\*Another Configuration\*\*\*

<Modification 7>

In Embodiment 2, in the intersection determining process (step S53 of FIG. 14), the map transmission unit 212 determines whether or not the mobile body 31 and an obstacle might collide with each other by determining whether or not the moving route R and the moving route RO intersects. However, even if the moving route R and the moving route RO intersect, the mobile body 31 and the obstacle will not collide with each other if the time at which the mobile body 31 passes through the point of intersection and the time at which the obstacle passes through the point of intersection differ.

Hence, if the moving route R and the moving route RO intersect, the map transmission unit 212 may determine whether or not the time difference between the time at which the mobile body 31 passes through the point of intersection and the time at which the obstacle passes through the point of intersection falls within a threshold time. Only when the time difference falls within the threshold time, the map transmission unit 212 may determine that the mobile body 31 and the obstacle might collide with each other.

Embodiment 3

Embodiment 3 is different from Embodiments 1 and 2 in that driving assistance is carried out with using a synthesis map 45. In Embodiment 3, this difference will be described, and description of identical points with Embodiments 1 and 2 will be omitted.

\*\*\*Description of Configuration\*\*\*

Figure 15:
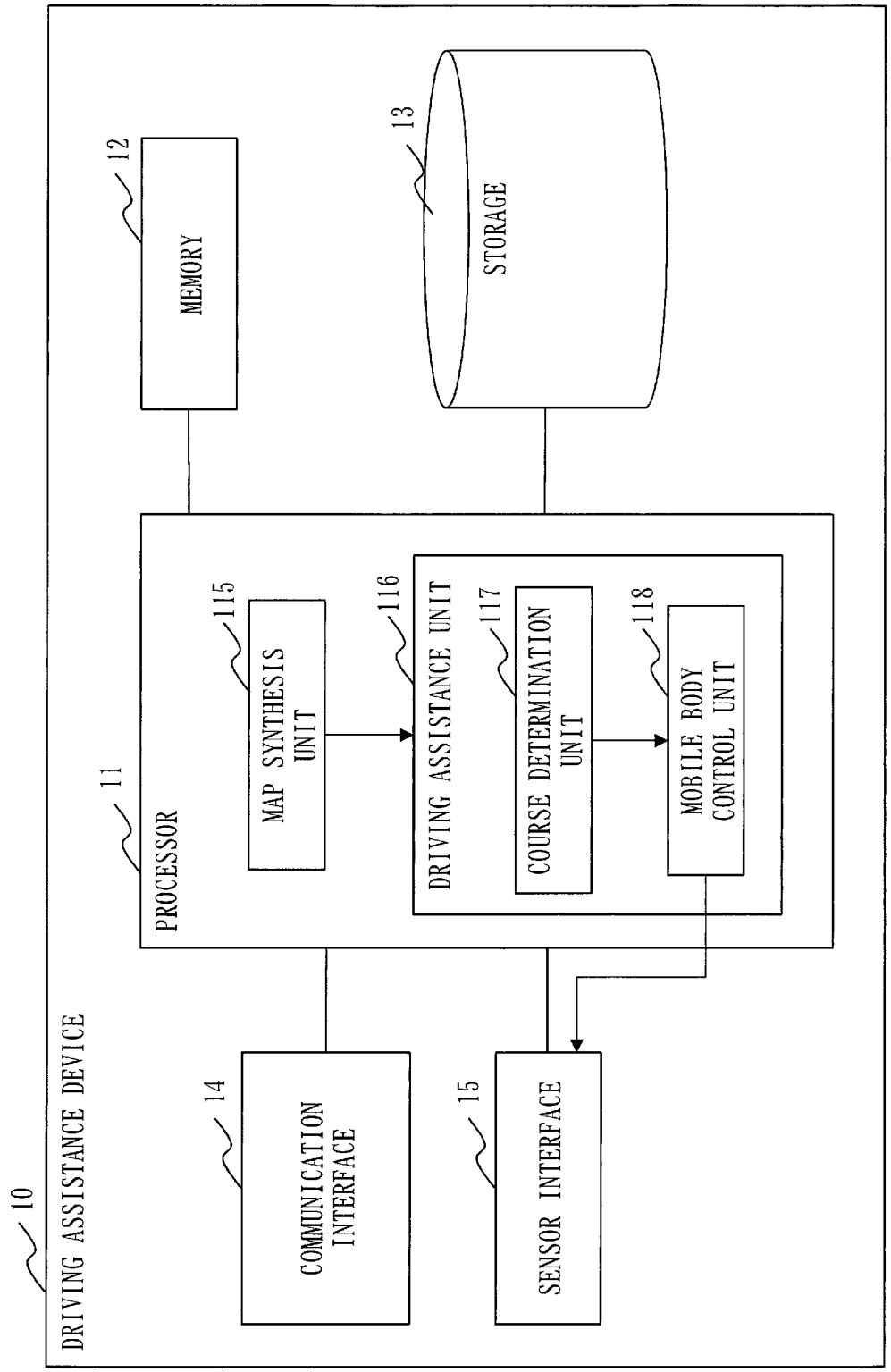
FIG. 15 is a configuration diagram of a driving assistance device 10 according to Embodiment 3.

FIG. 15 is a configuration diagram of a driving assistance device 10 according to Embodiment 3.

In FIG. 15, the functional constituent elements described in Embodiments 1 and 2 are not illustrated except for a map synthesis unit 115.

The driving assistance device 10 is provided with a driving assistance unit 116 in addition to the configurations described in Embodiments 1 and 2. The driving assistance unit 116 assists driving of a mobile body 31. The driving assistance unit 116 is provided with a course determination unit 117 and a mobile body control unit 118.

\*\*\*Description of Operation\*\*\*

Figure 16:
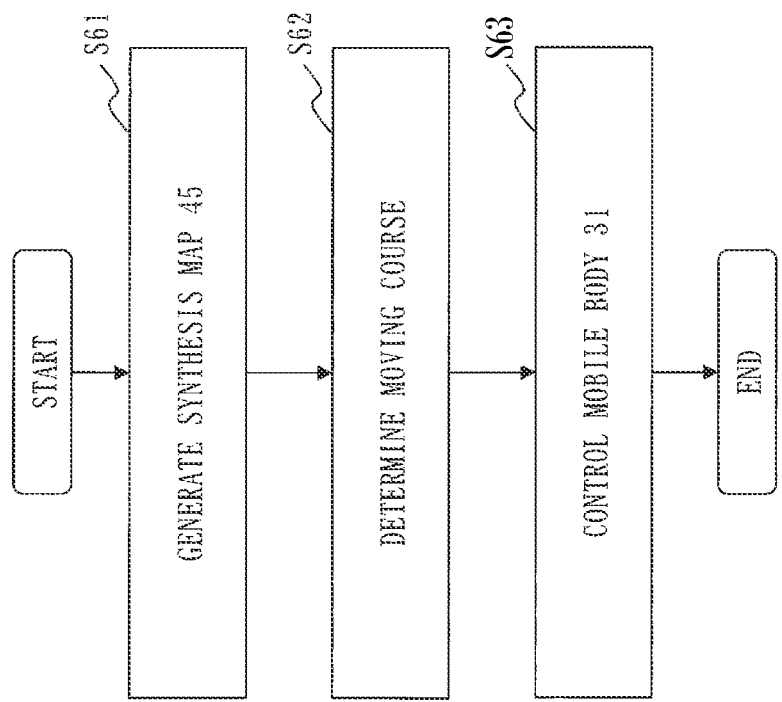
FIG. 16 is a flowchart illustrating an operation of a driving assistance system 1 according to Embodiment 3.

FIG. 16 is a flowchart illustrating an operation of a driving assistance system 1 according to Embodiment 3.

The operation of the driving assistance system 1 according to Embodiment 3 corresponds to a driving assistance method according to Embodiment 3. The operation of the driving assistance system 1 according to Embodiment 3 also corresponds to processing of a driving assistance program according to Embodiment 3.

(Step S61: Synthesis Map Generation Process)

The driving assistance device 10 generates the synthesis map 45 by the methods described in Embodiment 1 and 2.

(Step S62: Course Determination Process)

The course determination unit 117 determines a moving course based on the synthesis map 45 generated in step S61. Specifically, the course determination unit 117 determines the moving course such that the travel course is not in contact with an obstacle indicated on the synthesis map 45.

(Step S63: Vehicle Control Process)

The mobile body control unit 118 controls the mobile body 31 such that the mobile body 31 moves along the moving course generated in step S62. Specifically, if the mobile body 31 is a vehicle, the mobile body control unit 118 controls a driving device such as a steering wheel, an engine, and a motor of the mobile body 31, and a brake of the mobile body 31 such that the mobile body 31 travels along the moving course. Regarding this, the mobile body control unit 118 may control the mobile body 31 by also considering information of a sensor provided to the mobile body 31.

\*\*\*Effect of Embodiment 3\*\*\*

As described above, with the driving assistance system 1 according to Embodiment 3, the driving assistance device 10 conducts autonomous driving of the mobile body 31 based on the synthesis map 45. As a result, the driver of the mobile body 31 need not conduct driving, so the load to the driver can be reduced.

\*\*\*Another Configuration\*\*\*

<Modification 8>

In the above description, a configuration of autonomous driving of the mobile body 31 has been described. As Modification 8, a driving assistance device 10 may display a synthesis map 45.

Figure 17:
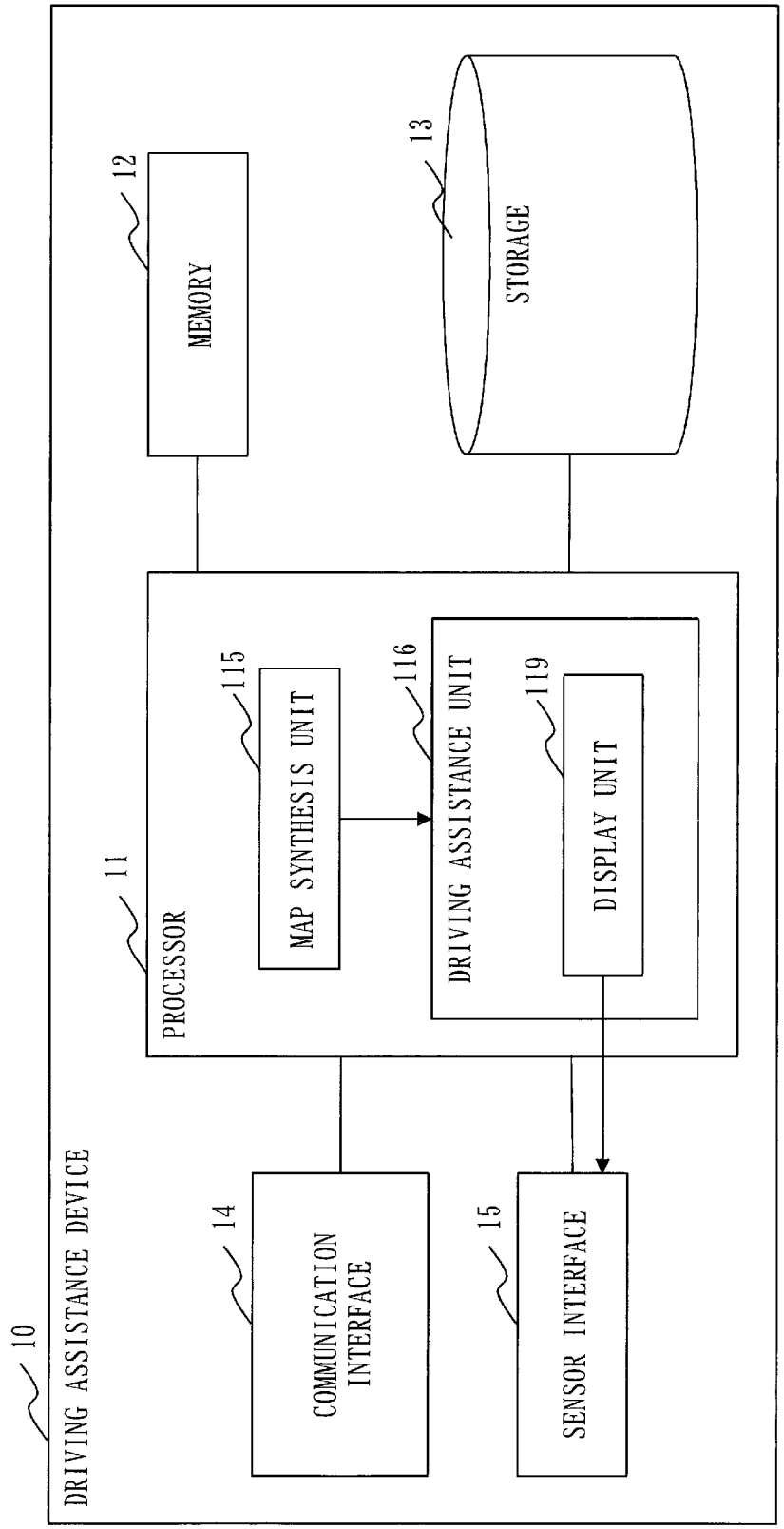
FIG. 17 is a configuration diagram of a driving assistance device 10 according to Modification 8.

The configuration of the driving assistance device 10 according to Modification 8 will be described with referring to FIG. 17.

The driving assistance device 10 is different from the driving assistance device 10 illustrated in FIG. 15 in that a driving assistance unit 116 is provided with a display unit 119 in place of the course determination unit 117 and mobile body control unit 118.

The display unit 119 displays the synthesis map 45 to a display device. Thus, the driver of a mobile body 31 can check the synthesis map 45 during driving, and the safety of driving is enhanced. Specifically, the driver can recognize an obstacle located at a position unseen from the mobile body 31, and accordingly can perform driving while avoiding coming into contact with the obstacle.

The driving assistance unit 116 may be provided with a display unit 119 as well as a course determination unit 117 and a mobile body control unit 118. In this case, the driving assistance device 10 displays the synthesis map 45 while conducting autonomous driving of the mobile body 31.

REFERENCE SIGNS LIST

1: driving assistance system; 10: driving assistance device; 11: processor; 12: memory; 13: storage; 14: communication interface; 15: sensor interface; 16: processing circuit; 111: request transmission unit; 112: map reception unit; 113: data acquisition unit; 114: map generation unit; 115: map synthesis unit; 116: driving assistance unit; 117: course determination unit; 118: mobile body control unit; 119: display unit; 131: map storing unit; 132: sensing range storing unit; 133: coefficient storing unit; 134: braking information storing unit; 20: map transmission device; 21: processor; 22: memory; 23: storage; 24: communication interface; 25: sensor interface; 26: processing circuit; 211: request reception unit; 212: map transmission unit; 213: data acquisition unit; 214: map generation unit; 31: mobile body; 32: mobile body; 33: road side apparatus; 41: internal map; 42: request data; 43: obstacle map; 44: external map; 51: route area; 52: blind spot area; 53: necessary area

The invention claimed is:

1. A host vehicle comprising:
a sensor comprising at least one of a light detection and ranging (LiDAR) sensor, a camera, and a positioning signal receiver; and
a driving assistance device comprising:
a sensor interface configured to receive, from the sensor, information of a current location of the host vehicle; and
at least one processor configured to:
generate an internal map based on the current location of the host vehicle;
determine, as a necessary area, an area in the internal map that covers a driving range of the host vehicle that is reachable at a current moving speed within a preset time, and that excludes a sensing area of the sensor mounted in the host vehicle;
transmit, to an external device that is another vehicle or a road side apparatus, a request that requests the external device to provide an obstacle map limited to the necessary area;
receive, from the external device, the obstacle map indicating an obstacle that is detected by the external device within the necessary area, as an external map;
combine the internal map and the external map to generate a synthesis map; and
control the host vehicle to travel along a moving route based on the synthesis map.

2. The host vehicle according to claim 1,
wherein the at least one processor is further configured to:
transmit, to the external device, the request that indicates a braking distance and a braking time of the host vehicle corresponding to the current moving speed, and
receive, from the external device, the external map indicating the obstacle within a range of the necessary area which is set based on the braking distance and the braking time.

3. The host vehicle according to claim 1,
wherein the at least one processor is further configured to:
indicate the moving route corresponding to a braking distance of the host vehicle, and
receive the external map indicating the obstacle that is predicted to move while the host vehicle drives along the moving route.

4. The host vehicle according to claim 2,
wherein the at least one processor is further configured to:
generate the internal map based on obstacle sensing data that is acquired by the sensor mounted in the host vehicle.

5. The host vehicle according to claim 1,
wherein the at least one processor is further configured to:
generate the internal map based on obstacle sensing data that is acquired by the sensor mounted in the host vehicle.

6. A first vehicle comprising:
a communication interface configured to receive, from a second vehicle, a request that requests the first vehicle to provide an obstacle map, information of a current moving speed of the second vehicle, and information of a sensing area of a sensor mounted in the second vehicle; and
at least one processor configured to generate the obstacle map limited to a necessary area that covers a driving range of the second vehicle that is reachable at the current moving speed within a preset time, and that excludes the sensing area of the sensor mounted in the second vehicle, the obstacle map indicating an obstacle that is detected by the first vehicle within the necessary area, wherein the communication interface is further configured to transmit, to the second vehicle, the obstacle map indicating the obstacle that is detected by the first vehicle within the necessary area, to enable the second vehicle to travel along a moving route based on the obstacle map.

7. The first vehicle according to claim 6,
wherein the request indicates a braking distance and a braking time of the second vehicle corresponding to the current moving speed, and
wherein the at least one processor is further configured to specify the obstacle within a range of the necessary area which is set based on the braking distance and the braking time.

8. The first vehicle according to claim 6,
wherein the request indicates the moving route corresponding to a braking distance of the second vehicle, and
wherein the at least one processor is further configured to specify the obstacle that is predicted to move while the second vehicle drives along the moving route.

9. A non-transitory computer readable medium of a host vehicle storing a driving assistance program that causes a computer to:
control a sensor of the host vehicle to obtain information of a current location and a current moving speed of the host vehicle;
generate an internal map based on the current location of the host vehicle;
determine, as a necessary area, an area in the internal map that covers a driving range of the host vehicle that is reachable at the current moving speed within a preset time, and that excludes a sensing area of the sensor mounted in the host vehicle;
control a communication interface of the host vehicle to transmit, to an external device that is another vehicle or a road side apparatus, a request that requests the external device to provide an obstacle map limited to the necessary area;
receive, from the external device, the obstacle map indicating an obstacle within the necessary area, as an external map;
combine the internal map and the external map as a synthesis map; and
control the host vehicle to travel along a travel route based on the synthesis map.

10. A non-transitory computer readable medium of a first vehicle storing a map transmission program that causes a computer to execute a method comprising:
controlling a communication interface of the first vehicle to receive, from a second vehicle, a request that requests the first vehicle to provide an obstacle map, information of a current moving speed of the second vehicle, and information of a sensing area of a sensor mounted in the second vehicle;
controlling at least one processor of the first vehicle to generate the obstacle map limited to a necessary area that covers a driving range of the host vehicle that is reachable at the current moving speed within a preset time, and that excludes the sensing area of the sensor mounted in the second vehicle, and
controlling the communication interface of the first vehicle to transmit, to the second vehicle, the obstacle map indicating an obstacle that is detected by the first vehicle within the necessary area, to enable the second vehicle to travel along a moving route based on the obstacle map.

11. A driving assistance system comprising:
a driving assistance device and a first communication interface mounted in a first vehicle; and
a map transmission device and a second communication interface mounted in a second vehicle being present on a periphery of the first vehicle,
wherein the driving assistance device of the first vehicle comprising at least one processor configured to:
generate an internal map based on a current location of the first vehicle; and
determine, as a necessary area, an area in the internal map that covers a driving range of the first vehicle that is reachable at a current moving speed within a preset time, and that excludes a sensing area of a sensor mounted in the first vehicle,
wherein the first communication interface of the first vehicle is configured to:
transmit, to the second vehicle, a request that requests the second vehicle to provide an obstacle map limited to the necessary area; and
receive, from the second communication interface of the second vehicle, the obstacle map indicating an obstacle that is detected by an external device within the necessary area, an external map
wherein the at least one processor is further configured to combine the internal map and the external map to generate a synthesis map, and control the first vehicle to travel along a travel route based on the synthesis map, and
the map transmission device comprising another at least one processor configured to:
receive, from the first vehicle, the request that requests the second vehicle to provide the obstacle map limited to the necessary area, and
transmit, to the first vehicle, the obstacle map indicating the obstacle within the necessary area.

* * * * *